(12) United States Patent
Xie

(10) Patent No.: US 9,501,492 B2
(45) Date of Patent: Nov. 22, 2016

(54) COMBINATION JOURNALING/NON-JOURNALING FILE SYSTEM

(75) Inventor: Tao Xie, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 1778 days.

(21) Appl. No.: 11/876,225

(22) Filed: Oct. 22, 2007

(65) Prior Publication Data

US 2008/0098040 A1  Apr. 24, 2008

Related U.S. Application Data

(60) Provisional application No. 60/862,720, filed on Oct. 24, 2006.

(51) Int. Cl.
*G06F 7/00* (2006.01)
*G06F 17/30* (2006.01)
*G06F 17/00* (2006.01)

(52) U.S. Cl.
CPC ... *G06F 17/30191* (2013.01); *G06F 17/30073* (2013.01); *G06F 17/30144* (2013.01); *G06F 17/30174* (2013.01); *G06F 17/30233* (2013.01)

(58) Field of Classification Search
CPC .................. G06F 17/30191; G06F 17/30233; G06F 17/30073; G06F 17/30174; G06F 17/30144; G06F 2201/855
USPC ........................................................ 707/648
See application file for complete search history.

(56) References Cited

U.S. PATENT DOCUMENTS

| | | | |
|---|---|---|---|
| 6,178,519 B1 * | 1/2001 | Tucker | 707/999.01 |
| 6,604,185 B1 * | 8/2003 | Fromm | 711/207 |
| 2002/0161972 A1 * | 10/2002 | Talagala et al. | 711/114 |
| 2003/0097611 A1 * | 5/2003 | Delaney et al. | 714/13 |
| 2003/0135703 A1 * | 7/2003 | Martin et al. | 711/162 |
| 2004/0267829 A1 * | 12/2004 | Hirakawa et al. | 707/200 |
| 2005/0004921 A1 * | 1/2005 | Beenau et al. | 707/100 |
| 2005/0086241 A1 * | 4/2005 | Ram et al. | 707/100 |
| 2005/0160308 A1 * | 7/2005 | Elcock et al. | 714/5 |
| 2005/0207726 A1 * | 9/2005 | Chen | 386/46 |
| 2006/0085493 A1 * | 4/2006 | Kim et al. | 707/206 |
| 2007/0115738 A1 * | 5/2007 | Emaru et al. | 365/203 |

OTHER PUBLICATIONS

Seltzer, Margo I. et al., Journaling Versus Soft Updates: Asynchronous Meta-data Protection in File Systems, 2000 USENIX Annual Technical Conference, USENIX Association, Jun. 18-23, 2000, pp. 71-84.*
Prabhakaran, Vijayan et al., *Analysis and Evolution of Journaling File Systems*, 2005 *USENIX Annual Technical Conference*, USENIX Association, pp. 105-120.

(Continued)

*Primary Examiner* — Kannan Shanmugasundaram

(57) ABSTRACT

A method and system for a combined journaling and non-journaling file system is disclosed. In the present invention, data is stored on a first storage media using a first device in a format associated with a file system, wherein the file system is a non-journaling file system. Journal information associated with the file system is stored on a second storage media in the first device, wherein the journal information is distinct from the file system and the data is readable by other devices having a file system compatible with the file system.

15 Claims, 3 Drawing Sheets

(56) References Cited

OTHER PUBLICATIONS

Piernas, Juan et al., *DualFS: a New Journaling File System without Meta-Data Duplication*, Conference Proceedings of the 2002 International Conference on Supercomputing, ICS'02, New York, New York, Jun. 22-26, 2002, pp. 137-146.

PCT Notification of Transmittal of the International Search Report and the Written Opinion of the International Searching Authority, or the Declaration, International Application No. PCT/US2007/022609, International filing date: Oct. 24, 2007, mailed Apr. 4, 2008, 13 pages.

* cited by examiner

COMBINATION JOURNALING/NON-JOURNALING FILE SYSTEM

RELATED APPLICATIONS

This application claims the benefit of priority to U.S. Provisional Application No. 60/862,720 filed Oct. 24, 2006, titled "Combo-Journaling/Non-Journaling File System," which is herein incorporated by reference in its entirety.

FIELD OF THE INVENTIONS

The present application generally relates to methods and systems for storing data compatible with multiple devices and, more particularly, to methods and systems for using journaling information with non-journaling file systems.

BACKGROUND

A file system determines how data is stored and organized on a storage device, such as a hard disk drive (HDD), flash memory, or other storage media. Unplanned interruptions to the operation of a computer-operated device, such as a power failure, system crash, or improper shut down by a user, file systems can be used to detect and resolve data inconsistencies. In non-journaling file systems, the recovery process can take a long time, while the system performs a block-by-block analysis of the data based on the file system. FAT16 and FAT32 are examples of non-journaling file systems. Journaling file systems cut down recovery time by continuously logging changes to the file system in a separate file called a journal. In the event of an unexpected interruption, the file system can be restored to a known good state by reading and replaying the journal when the system restarts. Unlike conventional non-journaling file systems, journaling file systems eliminate the need to perform a consistency check of the entire file system during system restart following a unplanned interruption. Systems using a journaling file system can recover from interruptions in a much shorter period of time. Examples of journaled file systems include ReiserFS, JFS, XFS (Extended File System), Linux ext3 and NTFS. Journaling file systems may record meta-data, that is, information about the data, such as when a data file was created, file size, and storage location, or both data and meta-data.

Historically, consumer electronics devices such as personal video recorders (PVRs), digital cameras, mobile phones, media players, and set-top boxes, have largely used non-journaling file systems, such as FAT 16 and FAT32. As a result, such consumer devices are more likely to experience data loss or file corruption issues if the operation of the device is unexpectedly interrupted. Traditional journaling techniques may be employed in such consumer devices but not without drawbacks. While data integrity and system availability of the consumer device is improved, the devices are often unacceptably slow to recover from unexpected interruptions. Furthermore, data stored on the devices may be incompatible with other devices not employing the same journaling file system.

Some prior art file system architectures have tried to improve performance by storing the journal log on a separate memory or disk than the file system. However, in these systems, the journal and the file system are not distinct, that is, the file system cannot operate if the journal is removed or disabled. Further, data stored using these prior art file systems is only interchangeable with other devices using the same type of journaled file system.

SUMMARY

Consistent with the invention, methods and apparatus for storing data compatible with multiple devices are disclosed. A method comprises storing data on a first storage media using a first device in a format associated with a file system, wherein the file system is a non-journaling file system; and storing journal information associated with the file system on a second storage media in the first device, wherein the journal information is distinct from the file system and the data is readable by other devices having a file system compatible with the file system.

An apparatus consistent with the present invention comprises a processor, a file system, and at least two memories. The first memory stores data in a format associated with the file system, wherein the file system is a non-journaling file system; and the second memory stores journal information associated with the file system, wherein the journal information is distinct from the file system and the data is readable by other devices having a file system compatible with the file system.

In at least some embodiments, the data may be stored on a hard drive and the journal is stored on a separate hard drive. In some embodiments, the journal information is stored in non-volatile memory, wherein the non-volatile memory holds stored data without constant power.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments implemented consistent with the invention, the examples of which are illustrated in the accompanying drawings. Wherever possible, the same reference numbers will be used throughout the drawings to refer to the same or like parts.

Methods and systems consistent with the present invention provide the many of the advantages of a journaling file system without compromising the data compatibility enjoyed by conventional non-journaling file systems. In general, methods and systems consistent with the present invention allow devices to store journaling data while using conventional file systems. The journal is stored in a separate memory separate and distinct from the file system.

Figure 1:
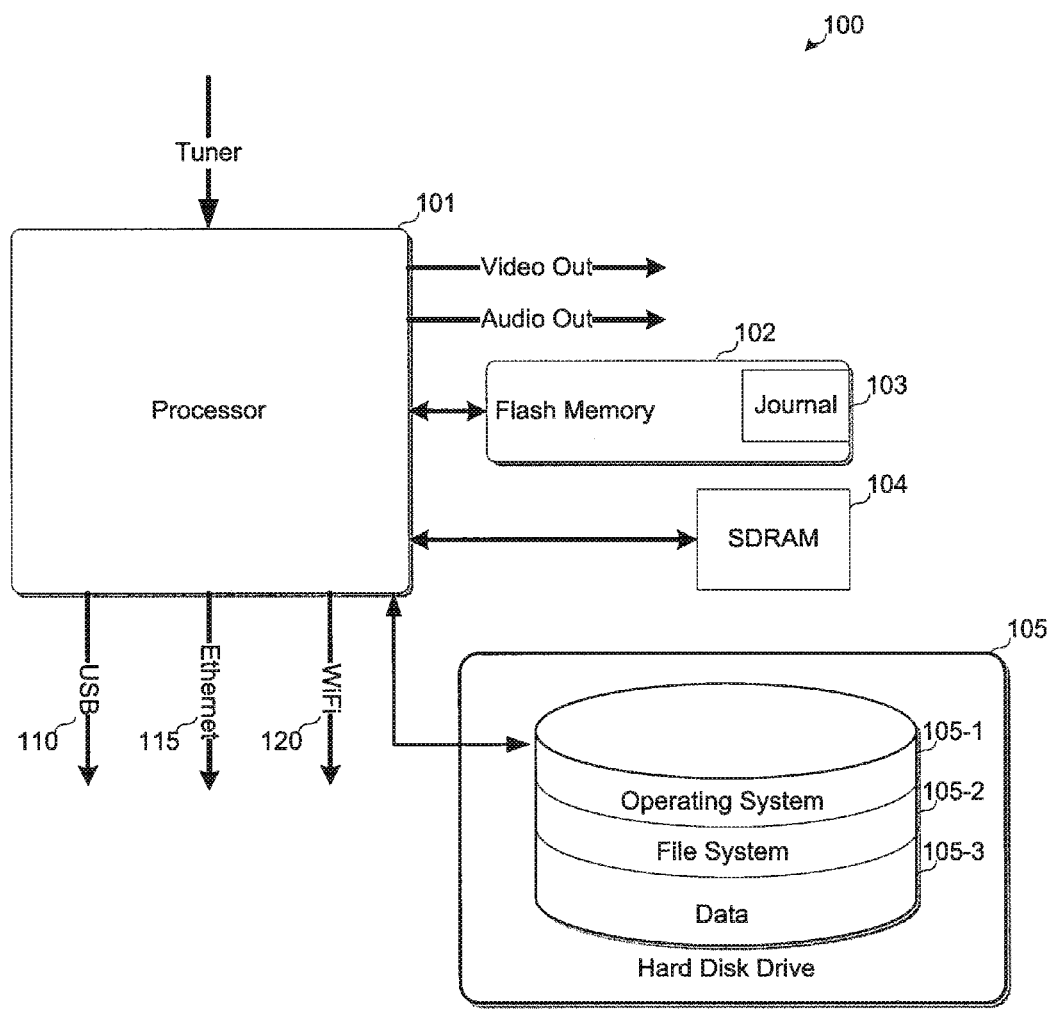
FIG. 1 illustrates an exemplary system containing a combined journaling and non-journaling file system consistent with embodiments of the present invention.

FIG. 1 illustrates an exemplary system 100 consistent with the invention. As shown in FIG. 1, system 100 comprises a processor 101 and at least two computer-readable storage media, such as flash memory 102, SDRAM 104, and hard disk drive 105. One or more of the computer-readable storage media may be portable, such as a portable memory cards comprise, for example Compact Flash cards (CF cards), Secure Digital cards (SD cards), Multi-Media cards (MMC cards), Memory Stick cards (MS cards), or memory sticks. Portable memory devices may be equipped with a connector plug such as, for example, a Universal Serial Bus (USB) connector or Firewire connector for uploading or downloading data and/or media between the memory device and a computer or other device.

System 100 may further include external interface ports, such as USB 110, Ethernet 115, and wireless communications port 120. System 100 may be operatively connected to a network via a wired and/or wireless communications link, such as Ethernet 115 or wireless communications port 120.

Figure 2:
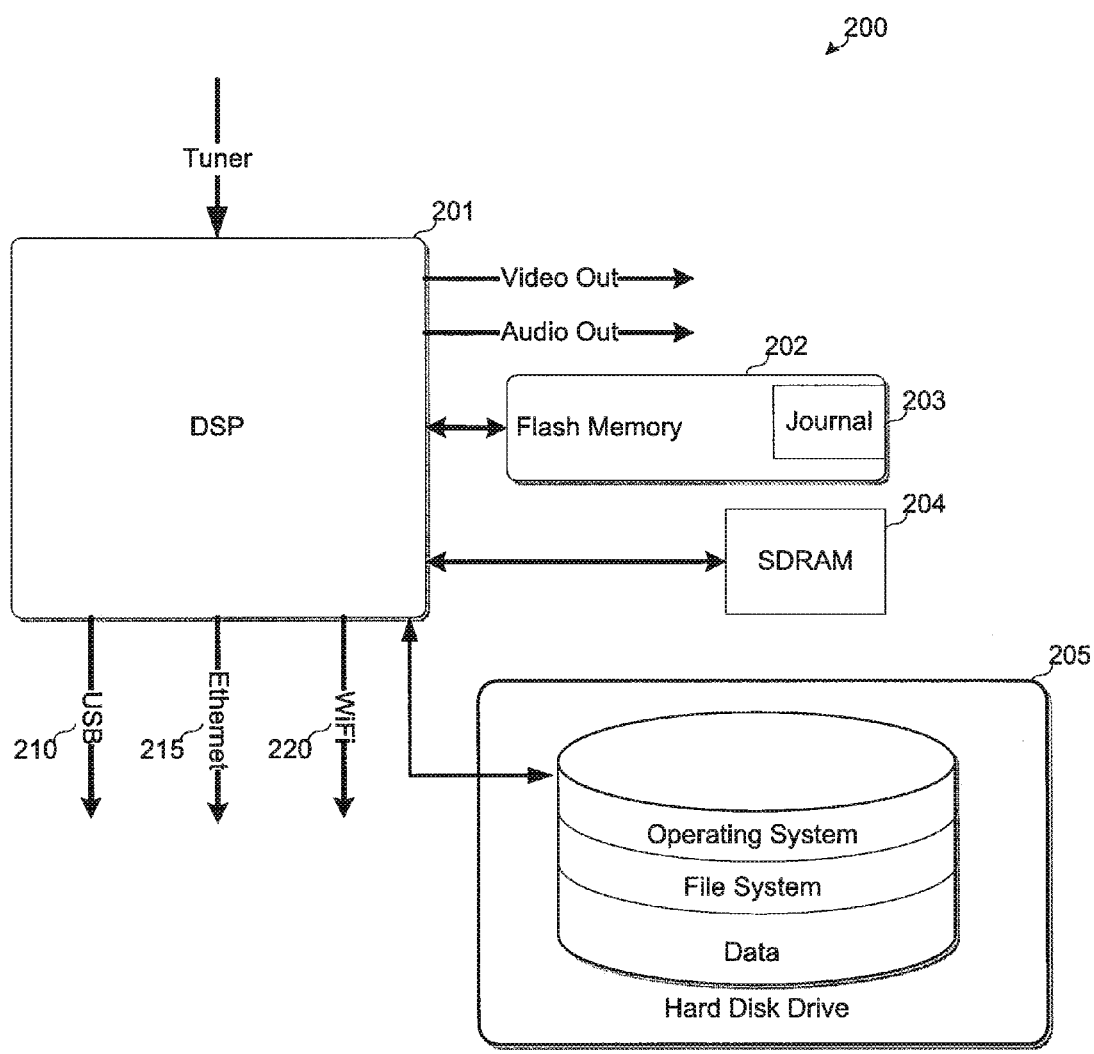
FIG. 2 illustrates an exemplary system containing a combined journaling and non-journaling file system consistent with embodiments of the present invention.

Other embodiments consistent with the invention may include one or more co-processors, such as a digital signal processor as shown in FIG. 2. The one or more co-processors may replace processor 101 or operate in conjunction with processor 101.

One of skill in the art will appreciate that system 100 can be any computer system configuration, including hand-held devices, multiprocessor systems, microprocessor-based or programmable consumer electronics, network PCs, mini-computers, mainframe computers, and the like.

As shown in FIG. 1, processor 101 executes programs stored in memory, such as flash memory 102, SDRAM 104, and hard disk drive 105. Co-processors may perform specialized functions, such as graphics processing, encryption, floating point arithmetic, and signal processing, or such functions may be performed by processor 101. In some embodiments, overall system performance may be improved by using one or more co-processors to offload such functions, specifically computationally intensive operations from the primary processor.

System 101 comprises operating system 105-1, file system 105-2, and data 105-3, shown in FIG. 1 as residing on hard disk drive 105. However, it is understood that any of operating system 105-1, file system 105-2, and data 105-3 could be stored on any computer-readable media operatively connected to system 100.

In the exemplary system of FIG. 1, the file system journal 103 is stored in flash memory 102 physically separated from file system 105-2, which is stored on hard disk drive 105. The processor 101 logically connects the file system stored on the hard disk drive 105 to the associated file system journal 103 by, for example, assigning a virtual memory address that relates the physical memory address of the file system journal 103 on flash memory 102 with the physical memory address of file system 105-2. To the system 100, both the file system and its associated journal 103 appear to the processor to be located on the same physical computer-readable storage media. In system 100, the combination of journal 103 and the file system located on hard disk drive 105, function as a journaling file system. Changes to the contents stored on hard disk drive 105 are tracked in journal 103. The contents stored on hard disk drive 105, however, are not affected by journal 103. In fact, the introduction of journal 103 does not in any way change the structure of hard disk drive 105.

FIG. 2 illustrates another exemplary system consistent with the invention. In this embodiment, processor 101 in FIG. 1 is replaced with a digital signal processor (DSP) 201. A DSP is a specialized processor, optimized for processing digital signals and commonly used in real-time computing applications. DSPs are frequently used in consumer electronic devices to perform video and audio encoding and decoding. Specialized for high speed arithmetic operations, real-time data transfer, and multiple access memory architectures, DSPs offer performance increases and power savings compared to general purpose processors.

As will be appreciated by one of ordinary skill in the art, the devices shown in FIGS. 1 and 2 may be, for example, a consumer device such as a personal video recorder (PVR), digital camera, mobile phone, media player, set-top box, or the like. In FIGS. 1 and 2, data is shown as being stored in hard disk drive 105 and 205. One of skill in the art will appreciate that in certain embodiments data may be stored in a portable memory, such as a memory cards, or other suitable memory media. Data may also in certain embodiments be stored on other forms of computer-readable media such as a CD-RW or DVD-RW. Using methods and systems consistent with the present invention, the hard disk drive or other storage media containing the data will be portable to a wider variety of systems.

Figure 3:
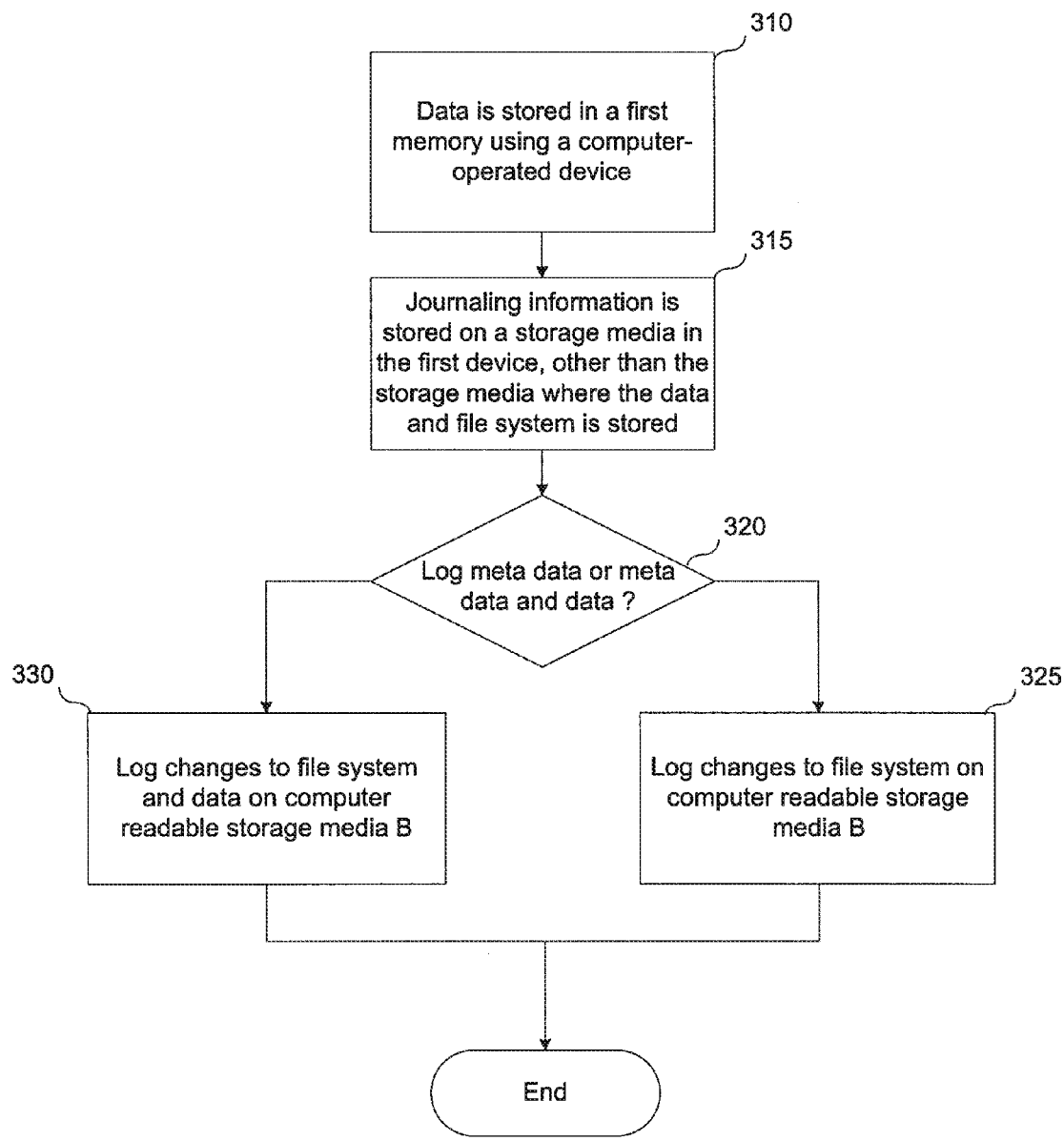
FIG. 3 illustrates a flowchart depicting an embodiment of a method for implementing a combined journaling and non-journaling file system on two separate computer-readable storage media contained in a single device consistent with embodiments of the present invention.

FIG. 3 illustrates an exemplary method consistent with the present invention. It will be readily appreciated by one of ordinary skill in the art that the illustrated procedure can be altered to delete steps, move steps, or further include additional steps.

In step 310, data is stored in a first memory using a computer-operated device. The data may be stored in, for example, an internal memory, such as a hard drive. The data is stored in a format associated with a non-journaling file system, such as FAT 16 or FAT 32.

In step 315, journaling information is stored on a storage media in the first device, other than the storage media where the data and file system is stored. The journal information may be stored in any user-defined file format. During operation of the computer-operated device, the processor continues to store data to the first memory, while recording changes to the file system and/or the data in the journal stored on the second media.

As with traditional journaling systems, both data and meta-data may be logged in the journal. The decision whether to log meta data only or meta data and data may be based on the application and can affect both system performance and system availability. Journaling data can reduce system performance because the data must be written to the storage media twice. In applications where data integrity and fast recovery time are critical, however, logging both meta data and data may be either recommended or required.

If the journal is configured to log meta data only in step 320, only changes to the file system are stored in step 325. If, however, the journal is configured to log both data and meta data in 320, changes to the file system as well as changes to the actual data are stored in the journal in step 325.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for storing data, the method comprising:
storing data on a first storage media of a device, the data being stored in accordance with a non-journaling file system;
storing journal information on a second storage media of the device, wherein the second storage media is physically separate from the first storage media, and the journal information (i) comprises a recording of changes made to the data stored on the first storage media in accordance with the non-journaling file system and meta data representing changes to the file system, and (ii) is distinct from the non-journaling file system;
assigning a virtual memory address that relates a physical memory address of the second storage media with a physical memory address of the first storage media such that both the first storage media and the second storage media appear to a processor to be located on a same physical computer-readable storage media; and
in response to an interruption, providing a system-level journaling file system functionality for the first device by:
combining the journal information and the non-journaling file system based upon the virtual memory address so that the recording of the changes made to the data stored on the first storage media in accordance with the non-journaling file system is usable to restore the non-journaling file system to a known good state that the non-journaling file system was in prior to the interruption.

2. The method of claim 1, wherein the second storage media is non-volatile memory.

3. The method of claim 1, wherein the first storage media is a hard disk drive.

4. The method of claim 1, wherein the second storage media is a hard disk drive.

5. The method of claim 1, wherein the first storage media is portable.

6. The method of claim 1, wherein the second storage media is portable.

7. The method of claim 1, wherein:
the data is stored on the first storage media in a format associated with the non-journaling file system; and
the journal information is stored on the second storage media in a user-defined format.

8. The method of claim 1, wherein the journal information is distinct from the non-journaling file system in that the non-journaling file system remains operable in response to the journal information being removed from the device.

9. The method of claim 1, wherein the non-journaling file system is a FAT 16 or a FAT 32.

10. An apparatus comprising:
a processor;
a non-journaling file system;
a first memory storing data in accordance with the non-journaling file system, the first memory comprising a hard disk drive; and
a second memory storing journal information, wherein the second memory is physically separate from the first memory, the second memory comprising a flash memory device, and the journal information (i) comprises a recording of changes made to the data stored within the first memory in accordance with the non-journaling file system and (ii) is distinct from the non-journaling file system,
wherein a virtual memory address is assigned that relates a physical memory address of the second memory with a physical memory address of the first memory such that both the data and the journal information appear to the processor to be located on a same physical computer-readable storage media, and
wherein, in response to an interruption, system-level journaling file functionality is provided for the apparatus by;
combining the journal information and the non-journaling file system based upon the virtual memory address so that the recording of the changes made to the data stored within the first memory in accordance with the non-journaling file system is usable to restore the non-journaling file system to a known good state that the non-journaling file system was in prior to the interruption.

11. The apparatus of claim 10, wherein the second memory is non-volatile memory.

12. The apparatus of claim 10, wherein the first memory is portable.

13. The apparatus of claim 10, wherein:
the data is stored within the first memory in a format associated with the non-journaling file system; and
the journal information is stored within the second memory in a user-defined format.

14. The apparatus of claim 10, wherein the apparatus comprises a consumer device.

15. The apparatus of claim 14, wherein the consumer device is one of a personal video recorder, a digital camera, a mobile phone, a media player, or a set-top box.

* * * * *